United States Patent [19]
Falke et al.

[11] Patent Number: 5,145,822
[45] Date of Patent: Sep. 8, 1992

[54] METAL FOIL SUPPORTED CATALYST

[75] Inventors: Holger Falke, Hemmingen; Guenther Strauss, Hanover, both of Fed. Rep. of Germany

[73] Assignee: Solvay Catalysts GmbH, Hanover, Fed. Rep. of Germany

[21] Appl. No.: 704,934

[22] Filed: May 23, 1991

[30] Foreign Application Priority Data

Jun. 2, 1990 [DE] Fed. Rep. of Germany ....... 4017892

[51] Int. Cl.$^5$ .......................... B01J 27/20; B01J 23/42; B01J 23/44; B01J 23/74

[52] U.S. Cl. .................................... 502/150; 502/159; 502/439; 502/527; 423/219

[58] Field of Search ............... 502/326, 339, 344, 439, 502/527, 159, 173, 330, 150; 423/219

[56] References Cited

U.S. PATENT DOCUMENTS

| | | | |
|---|---|---|---|
| 3,675,096 | 7/1972 | Kiess | 423/219 |
| 3,891,575 | 6/1975 | Braeutigam et al. | 252/455 |
| 4,207,291 | 6/1980 | Byrd et al. | 502/400 X |
| 4,483,940 | 11/1984 | Ono et al. | 502/159 |

FOREIGN PATENT DOCUMENTS

| | | |
|---|---|---|
| 970172 | 7/1975 | Canada . |
| 149912 | 7/1985 | European Pat. Off. . |
| 3437477 | 1/1986 | Fed. Rep. of Germany . |
| 3501941 | 7/1986 | Fed. Rep. of Germany . |
| 3914294 | 10/1990 | Fed. Rep. of Germany . |
| 3920428 | 1/1991 | Fed. Rep. of Germany . |
| 4009575 | 1/1991 | Fed. Rep. of Germany . |
| 2004454 | 1/1990 | Japan . |

*Primary Examiner*—W. J. Shine
*Assistant Examiner*—Douglas J. McGinty
*Attorney, Agent, or Firm*—Foley & Lardner

[57] ABSTRACT

A supported catalyst having a support body which is formed by one or more metal foils and which is well suited for catalytically decomposing ozone and for catalytically oxidizing carbon monoxide. Preferred embodiments further include a heat exchanger which permits the supported catalyst to be used as a catalytic heat exchanger, in particularly for treating fresh air for passenger compartments of vehicles.

14 Claims, No Drawings

METAL FOIL SUPPORTED CATALYST

BACKGROUND OF THE INVENTION

This invention relates to supported catalysts for the catalytic treatment of gaseous media at temperatures below about 100° C. and their use.

Supported catalysts for the catalytic treatment of gaseous media in the middle-temperature and low-temperature range are already known. For instance, Falke et al., German published Patent Application No. DE 3,914,294 describes a supported catalyst for the oxidation of carbon monoxide which operates at ambient temperature. This supported catalyst comprises a catalytically active mixture of gold or gold and iron oxide on iron oxide. Falke et al., German published Patent Application No. DE 3,920,428 describes a supported catalyst for the catalytic decomposition of ozone. This supported catalyst likewise operates at ambient temperature and comprises a material which brings about the catalytic decomposition of ozone, for instance metals or transition metal oxides, in particular hopcalite, applied to a foam support. There remains a need, however, for supported catalysts for catalytically treating gaseous media at temperatures below about 100° C. which usefully extend the range of the supported catalysts already known.

SUMMARY OF THE INVENTION

It is the object of the invention to provide a new supported catalyst for catalytically treating gaseous media.

A further object of the invention is to provide a supported catalyst which extends the range of prior art supported catalysts.

Another object of the invention is to provide a supported catalyst which is comparatively easy to manufacture.

An additional object of the invention is to provide a supported catalyst which can be effectively used at relatively low temperatures.

Yet another object of the invention is to provide a supported catalyst which is resistant to impact damage.

A still further object of the invention is to provide a supported catalyst which may be used as a catalytic heat exchanger in place of a non-catalytic heat exchanger without requiring any additional space.

It is also an object of the invention to improve the methods of catalytically decomposing ozone, or of catalytically oxidizing carbon monoxide, or of treating fresh air for supply to vehicle passenger compartments, or of treating ventilating air.

These and other objects of the invention are achieved by providing a supported catalyst for catalytically treating gaseous media at temperatures below about 100° C., comprising: a) a support body made of metal foil having a thickness of at most 0.5 mm, the support body having at least two channels having a height of less than about 10 mm permeable to the gaseous medium to be treated; b) a catalytic material having a particle size below about 0.5 mm catalytically active at a temperature below about 100° C., and c) a permanently elastic organic coating on said metal foil for adhering the catalytic material to the support body.

DETAILED DESCRIPTION OF PREFERRED EMBODIMENTS

The supported catalyst according to the invention for the catalytic treatment of gaseous media at temperatures below about 100° C. comprises: a) a support body made of metal foil of a thickness of at most 0.5 mm and having two or more channels permeable to the gaseous medium to be treated, the height of the channels being less than about 10 mm, b) a material having a particle size below about 0.5 mm, which is catalytically active at a temperature below about 100° C., and c) a permanently elastic coating of organic material on the metal foil, which coating brings about the adhesion of the catalytic material to the support. As used herein, the term "metal foil" is intended to embrace flexible metal foils, for instance aluminum foil, and also dimensionally stable metal foils such as sheet metals, for instance iron, steel or special steel sheet. The thickness of the metal foil is preferably less than 0.2 mm, for instance between 0.05 and 0.2 mm.

The distances between the metal foils are preferably less than 5 mm, and particularly preferably between 1 and 3 mm. The distance desired in each case between two of the metal foils which form the channels, or between the windings of a foil wound in a spiral can be set by suitable means, for instance positioning pins, holding devices on the end or the like.

These may be metal foils of widely varying dimensions, for instance metal foil in strip form with a width of 1 to 50 cm or more and a length of 0.1 to 10 m. Laminar metal foils, for instance with a width of 1 to 100 cm and a length of 0.1 to 10 m, may also be used.

The metal foils may be textured, for instance corrugated in an arc-shape or bent or folded in a triangle, trapezium or rectangle. The foils are preferably flat, i.e. have a smooth surface.

The metal foils can be arranged to produce very varied support bodies in the supported catalyst according to the invention. For instance, they may be in the form of honeycomb bodies with a large number of channels, with the distance between two walls of the channels, as stated above, being at most about 10 mm. The channels formed then have for instance a rectangular, square, triangular or hexagonal cross-section. The shape of the honeycomb body is not critical. These may be honeycomb bodies with a rectangular, round or oval cross-section, with the channels being formed for instance by winding textured foils, by textured or smooth metal foils arranged in layers, etc. Such honeycomb body shapes are known. They may for instance have a cross-section with a height or width of 2 to 20 cm and a length of 5 to 30 cm.

The support body may however be of other shapes. It may for instance be formed of smooth metal foils wound in a spiral. The support body may for instance also consist of 2 or more foils which are of a greater or lesser length and may be inserted concentrically one inside the other, formed into a correspondingly large number of tubes with increasing radius. The distance between the tubes inserted one inside the other may be constant across the entire length or alternatively tapered towards one of the ends. The distance between the layers formed by the tube surfaces, which, as stated above, should be less than about 10 mm, may be determined by suitable means, for instance positioning pins or corresponding holding devices on the end of the tubes.

In another embodiment, the support body is formed from textured or smooth metal foils arranged one over the other in layers. Unlike honeycomb bodies which have channels with relatively small entry and exit surfaces for the medium to be treated, the entry or exit surface in such embodiments is relatively large.

The different support bodies may be closed transversely to the direction of flow of the gaseous medium to be treated by appropriate encasing or beading of the foils.

A preferred supported catalyst according to the invention for the catalytic treatment of gaseous media at temperatures below about 100° C. comprises: a1) as the support a metal foil of a thickness of at most 0.5 mm which has been wound into a spiral support body, the distance between the layers formed upon winding being less than about 10 mm, or a2) as the support a plurality of metal foils of a thickness of at most 0.5 mm which are arranged in layers, the distance of the layers from each other being less than about 10 mm, b) a material having a particle size below about 0.5 mm, which is catalytically active at a temperature below 100° C., c) a permanently elastic coating of organic material on the metal foil, which coating brings about the adhesion of the catalytic material to the support.

The thickness of the metal foils is preferably below 0.2 mm. The distance between the metal foils is preferably below 5 mm. The particle size of the catalytically active particles is preferably 0.1 to 0.3 mm.

In one embodiment, a metal foil wound in a spiral is used as the support body. The number of windings may be two or more. Depending on its purpose, the support body may be of greater or lesser length, for instance from a few centimeters up to 30 cm.

It will be apparent to a person skilled in the art that the efficiency of the supported catalyst is greater, the greater the surface of the metal foil, i.e. the longer the support body and the greater the number of windings. The supported catalyst may be wound so that the distances between the windings are substantially equal over the entire length along the direction of flow, but it may also be shaped so that it tapers conically to one side. Advantageously, the border of the outer winding which extends parallel to the direction of flow of the gaseous medium to be treated through the supported catalyst is connected in gas-tight manner to the preceding winding over the entire length of the support body so that the gaseous medium to be treated does not escape radially to the direction of flow.

Another variant of the supported catalyst according to the invention comprises a support which is formed of a plurality, i.e. two or more, metal foils which are arranged in layers.

The metal foils may be textured, for instance corrugated or folded, but they are preferably flat. The metal foils may be arranged in very varied ways to form a support body.

In one preferred embodiment, two or more flat metal foils are used which are arranged substantially parallel to each other in layers, the distance of the layers from each other, as stated above, being less than about 10 mm, preferably less than 5 mm. Desirably, support bodies are used which comprise a plurality of metal foils, preferably 10 to 500 foils, particularly preferably 30 to 300 metal foils.

In this preferred embodiment too, the length and width of the metal foils may vary within a wide range; for instance, metal foils of a length of 10 to 100 cm and of a width of 1 to 10 cm or more may be used. Here too, it is true in principle that the larger the surface of the support foils used, the greater the efficiency of the supported catalyst.

The metal foils used may be coated on one side or, preferably, on both sides.

The supported catalyst may furthermore have a means for supplying or removing heat. One suitable means for supplying heat is for instance an electrically operated heating device, for instance heating coils or heating elements or the like.

However, they may also be devices in which the supply or removal of heat is brought about by a fluid heat exchange medium, for instance hot air, cold air, organic or inorganic liquids, for instance halogenated hydrocarbons or water. In the supported catalyst according to the invention, in which a plurality of metal foils are arranged in tube form concentrically about a common axis, or which comprise a plurality of metal foils arranged in honeycomb-like manner or in layers substantially parallel to each other, this is done most simply in that it is not the gaseous medium which is to be treated catalytically but the heat exchange medium which flows through one or more of the channels formed between the metal foils. These channels then have to be closed off from the other channels so that no mixing of the gases to be treated and the heat exchange medium takes place.

In a preferred embodiment, one or more tubes through which the fluid heat exchange medium can circulate are used as a means for supplying or removing heat.

For supported catalysts in which the support body is formed by a plurality of metal foils which are arranged substantially parallel to each other in layers, a special arrangement of these tubes through which heat exchange medium flows is preferred: one or more tubes through which the heat exchange medium flows are advantageously arranged perpendicular to the axis of flow of the medium which is to be catalytically treated and at right-angles to the metal foils which are arranged in layers. Such a supported catalyst may also be called a catalytic heat exchanger.

In principle, foils or sheets of any metals or alloys desired may be used as the metal foil. For instance, aluminum foils, sheet iron, steel sheets, or special steel sheets may be used.

A permanently elastic, organic material is used as the support coating which brings about adhesion. For instance, adhesives made of organic polymers, for instance acrylic esters, allyl esters or silicones can be used. Acrylic esters are highly suitable. In the higher temperature range, for instance above 80° C., adhesives which are stable at correspondingly higher temperature are suitable, for instance silicone resins.

The supported catalyst according to the invention is suitable for use in a large number of catalytic treatment processes for gaseous media, for instance process gas purification or pure gas production.

It is particularly suitable as a supported catalyst for the catalytic decomposition of ozone and as a supported catalyst for the catalytic oxidation of carbon monoxide.

In the embodiment as a supported catalyst for the catalytic decomposition of ozone, any known materials which catalyze the decomposition of ozone can be used as the catalytically active material. These include in particular precious metals, in particular palladium or platinum, metal oxides, in particular transition metal oxides, or mixtures of such substances. Mixed transition metal oxides, in particular mixtures which contain manganese dioxide and copper oxide and have become known under the name hopcalite, are highly suitable. Hopcalites may for instance consist of manganese dioxide and copper oxide, but they may also contain activators and promoters, for instance other metal oxides such as nickel oxide, cobalt oxide, silver oxide, lithium oxide and/or potassium oxide. A suitable manganese dioxide-copper oxide mixture with binder is commercially available from Kali-Chemie AG of Hannover Germany under the trade name "SG 2118".

The catalytically active material desirably has a particle size of up to 0.5 mm. Preferably it has a particle size of 0.05 to 0.3 mm.

The finished supported catalyst contains the catalytically active material in a quantity of up to 30% by weight, preferably in a quantity of 1 to 20% by weight, relative to the finished supported catalyst.

The invention also relates to the use of a supported catalyst according to the invention incorporating an ozone decomposition catalyzing material as described above, for the catalytic decomposition of ozone in ozone-containing air. In use, the ozone-containing air is passed across the ozone-decomposing supported catalyst.

In the embodiment as a supported catalyst for the catalytic oxidation of carbon monoxide, the catalytically active material is a mixture of gold and iron (III) oxide, a mixture of gold and tricobalt tetroxide, a mixture of iron and nickel oxide or a mixture of such mixtures. The catalytically active material is present in a particle size of up to 0.5 mm, preferably in a particle size of 0.05 to 0.3 mm.

If the gold is present in a mixture with iron (III) oxide, the atomic ratio of gold to iron is in the range of about 1:999 to about 1:4, preferably between about 1:99 to 1:9, particularly preferably between about 1:49 and about 1:14. If the gold is present in a mixture with tricobalt tetroxide, the atomic ratio of gold to cobalt is in the range also given for iron. If the gold is present in a mixture with nickel (II) oxide, the atomic ratio of gold to nickel is in the range of 1:49 to 1:8.

In a preferred embodiment, the catalytically active constituent contains a mixture of gold and iron (III) oxide. In a particularly preferred embodiment, the catalytically active constituent consists of such a mixture.

The catalytically active constituent may be produced as follows:

In a first step, a mixture of a gold compound and an iron, cobalt or nickel compound is produced. For simplicity, only the production of a mixture of a gold compound and an iron compound will be described in detail below. Mixtures with cobalt or nickel compounds can also be produced in similar manner.

The desired mixture of a gold compound and an iron compound may be obtained according to different variants.

According to one variant, a solution is produced which contains a dissolved gold compound and a dissolved iron compound. After removal of the solvent, for instance by evaporation, the desired mixture of a gold compound and an iron compound is obtained.

According to another variant, iron oxide, for instance hematite, is used as the iron compound, and this material is impregnated with the solution of a gold compound. The mixture obtained upon impregnation may be dried if desired.

According to a preferred variant, a solution initially is produced which contains a dissolved gold compound and a dissolved iron compound. By adding a precipitating agent which is effective for both types of metal, for instance a base, a jointly precipitated mixture of a gold compound and an iron compound, for instance a jointly precipitated mixture of gold hydroxide and iron (III) hydroxide, is obtained. This mixture can then be dried if desired.

In the variants described above, organic solvents, for instance alcohols, nitriles such as acetonitrile or other solvents such as dimethyl formamide can be used as solvents, optionally in a mixture with water. The preferred solvent is pure water.

Salts which contain gold cations, such as gold halides, in particular gold trichloride, may for instance be used as the gold compound. Salts with complexed gold cations may also be used, in which case possible complexing agents may include, for instance, ammonia or primary, secondary or tertiary amines substituted with lower alkyl groups. For example, gold-(diethylamine) trichloride can be used.

For instance, those gold compounds which contain the gold in the form of complex anions may also be used. For instance, the auric acids, hydrated if desired, such as haloauric acids, in particular chloroauric acid, and also cyanoauric acid or nitratoauric acid and also the corresponding alkali metal salts, e.g. the potassium salt, may be used.

In the process of the present invention, chloroauric acid tetrahydrate is preferably used as the soluble gold compound.

The concentration of the solution of the gold compound is not critical. It is advantageously between about 5 g/l and 100 g/l solvent.

In order to prepare iron salt solutions, solutions of salts of trivalent iron are advantageously used. If salts of bivalent iron are used, oxidative treatment for conversion into trivalent iron follows. This may take place, for instance, in the calcination which will be described below due to the presence of atmospheric oxygen. For instance, iron salts with the anions of organic acids, for instance formic acid, but preferably salts with the anions of inorganic acids, may be used. Iron halides and pseudo-halides, for instance, in particular iron chloride, are suitable. Iron nitrate is highly suitable. The concentration of the iron salt is advantageously between about 10 and 400 g/l solvent.

According to the preferred embodiment, a preferably aqueous solution is initially prepared which contains a dissolved gold compound, preferably chloroauric acid, and a dissolved iron compound, preferably iron nitrate, and the resulting solution is contacted with a precipitating agent, for instance with a base. Examples of suitable bases include basic alkali metal or ammonium compounds, for instance ammonium hydroxide, sodium hydroxide solution or potassium hydroxide solution, carbonates or bicarbonates of sodium, potassium or ammonium. Ammonium compounds, in particular ammonium carbonate, are particularly suitable. The base is advantageously used in the form of a solution, particularly in the form of an aqueous solution. The concentration is not critical and may advantageously lie between 10 g/l and 300 g/l.

In a preferred embodiment, when producing the mixture of gold compound and iron compound, amounts of gold compound and iron compound are used which correspond to an atomic ratio of gold to iron of from 1:999 to 1:4, preferably from 1:99 to 1:9, particularly preferably from 1:49 to 1:14.

The mixtures of gold compound and iron, cobalt or nickel compound, which can be obtained according to one of the methods described above, may be dried at temperatures between 50 and 150° C. The mixture, dried if desired, is calcined at temperatures of at least 200° C. to convert it into the catalytically active constituent. This may take place in an atmosphere of inert gases such as nitrogen. Advantageously, the calcination takes place in air. It takes place over a period of several hours, for instance 1 to 24 hours. It is not until this calcination that the mixture is activated and can then be used as the catalytically active constituent for the oxidation of carbon monoxide at temperatures below about 100° C. The calcination temperature is preferably between about 250° C. and about 500° C.

Advantageously, the catalytically active constituent should be applied to the support material in the form of particles which are as small as possible. Particle sizes below 0.3 mm are particularly suitable. If the catalytically active constituent is not present in the form of suitably small particles after calcination, it is comminuted using known methods to particle sizes below about 0.5 mm, if desired to below 0.3, in particular between about 0.05 and 0.3 mm, for instance by ball mills or beater mills.

The supported catalyst for the catalytic oxidation of carbon monoxide contains the catalytically active material in a quantity of up to 30% by weight, preferably in a quantity of 1 to 20% by weight, relative to the total weight of metal foil, adhesion-promoting coating and catalytically active material used.

A particularly preferred supported catalyst for the catalytic oxidation of carbon monoxide in the gas phase at temperatures below about 100° C. comprises a) a support body which is formed by a plurality of laminar metal foils having a thickness of at most 0.3 mm which are arranged in layers substantially parallel to each other, the distance of the layers from each other being less than about 5 mm; b) as the catalytically active material a mixture of gold and iron (III) oxide with an atomic ratio of gold to iron of between 1:99 and about 1:9, in particular between about 1:49 to 1:14, with the catalytically active material having a particle size of less than about 0.3 mm; c) a support coating of organic material with a layer thickness of less than about 0.1 mm for adhering the catalytic material to the foil support, and d) one or more channels through which a fluid heat exchange medium flows, in particular tubes through which a fluid heat exchange medium flows. For this supported catalyst, "a plurality of metal foils" means two or more, preferably a large number of metal foils, for instance 10 to 500, in particular 30 to 300 metal foils.

The invention also relates to the use of the supported catalysts according to the invention for catalytically oxidizing carbon monoxide in carbon monoxide-containing gases, in particular air. The supported catalysts according to the invention are usable even at temperatures below about 100° C.

They are catalytically active even in the presence of moisture (water vapor). The carbon monoxide which is to be oxidized may be contained in the gas mixtures which are to be purified in a relatively low concentration, for instance in a concentration of about 5 ppm to 100 ppm, but also in higher concentrations, up to 1% by volume and more. The supported catalysts according to the invention are particularly well suited for the oxidation of carbon monoxide in air which may optionally contain moisture, at temperatures below about 100° C. Their field of use lies for instance in air conditioning and in so-called self-contained breathing equipment, as is used, for instance, in mines, industrial factories and in rescue services, and also in the processing of industrial used air.

When used for the oxidation of carbon monoxide at temperatures below about 100° C., a gas containing carbon monoxide and oxygen is passed over one of the supported catalysts described above. The oxygen content should advantageously correspond at least to the quantity required for complete oxidation of carbon monoxide.

A process in which carbon monoxide-containing air is passed through a supported catalyst produced according to one of the above described production processes is preferred. In this case the air may be dry air, or it may be moist, water-containing air which contains water vapor in small quantities up to saturation point, for instance between about 0.1% and 80% relative humidity.

Preferably, the process for the oxidation of carbon monoxide is carried out at temperatures below about 50° C., in particular at ambient temperature, i.e. between about 15 and about 25° C.

The exhaust gases of internal combustion engines are one source of carbon monoxide air pollution. However, this air which is polluted with CO is at the same time the air breathed by people in traffic, for instance car drivers and passengers, truck drivers and passengers, and bus drivers and passengers. A special field of use of the supported catalyst according to the invention to purify air supplied to the passenger compartments of cars, commercial vehicles and buses. The supported catalysts according to the invention fulfill this function very well, since they can remove the carbon monoxide content from air effectively at low temperature without requiring energy. They are active over a long period and their activity suffers little or no deterioration due to the naturally changing moisture content of the air which is to be purified.

The use of a supported catalyst for catalytic oxidation of carbon monoxide which has one or more means, in particular channels, tubes or the like, through which a fluid heat exchange medium flows, is particularly advantageous. This supported catalyst, which can also be regarded as a catalytic heat exchanger, is very particularly suited for purifying the fresh air which is supplied to the interiors of vehicles, in particular to the driver's or passenger compartments of motor vehicles such as cars, busses or commercial vehicles. This fresh air is usually passed into the interiors via a heat exchanger. The fresh air can be maintained at a desired temperature by suitable heat exchange media, for instance cooling water. The supported catalyst according to the invention for the catalytic oxidation of carbon monoxide, which at the same time also has heat exchange means, is also particularly advantageous because it can be used instead of a non-catalytic heat exchanger. It requires not additional space, and furthermore subsequent retrofitting is possible.

Furthermore, the CO oxidation catalyst can also be used for the catalytic treatment of the air which is supplied to workplaces or dwellings, or for the catalytic treatment of the air circulated in such rooms, for instance incorporated in air-conditioning units. The carbon monoxide content, for instance produced by smokers, is decreased thereby.

The production of the supported catalysts according to the invention may take place in principle according to two variants.

One variant involves initially providing the metal foil or foils with the permanently elastic organic polymer which promotes adhesion, then applying the catalytically active material which is in the form of particles of a size of up to 0.5 mm, preferably 0.3 mm, and then, advantageously after a waiting time for drying or hardening the polymer used, processing the catalytically coated metal foil to produce a support body, for instance by winding the optionally deformed foils, by arranging a plurality of foils in layers, with the desired, preferably equidistant distance between the foils forming the layers being determined by corresponding spacers, positioning pins, tubes through which the heat exchange medium flows, or the like. Suitable plates, for instance, surrounding metal foils, which optionally may be catalytically coated, may form the border of the layers perpendicular to the axis of flow of the medium which is to be treated catalytically. Of course, such a border may also be produced by corresponding beading of the foils arranged in layer form.

Depending on the purpose and form of embodiment of the supported catalyst, the metal foils coated with the catalytic material may also be subjected to additional machining steps. For instance holes may be punched in the foils through which tubes can be inserted for circulating a heat exchange liquid, for instance cooling water.

The layer of the organic polymer should be as thin as possible. Advantageously it should be thinner than the average particle size of the catalytically active material. Particularly thin layers can be produced by thinning and applying the polymer or prepolymer in a suitable solvent.

The catalytically active material may, for instance, be applied to the foil provided with the adhesion promoter in a shaker or vibrating machine.

According to a second variant of the invention, the supported catalysts according to the invention are produced in that the metal foils which have already been arranged into a support body are provided with the permanently elastic organic compound which promotes adhesion and then the catalytically active material, which is in the form of particles of a size of up to 0.5 mm, preferably 0.3 mm, is applied.

It is thus possible, for instance, to coil up a corresponding metal foil or alternatively to arrange a plurality of metal foils in layers to form a corresponding support body, with the desired distance between the layers again being determined by suitable positioning pins or spacers. A non-catalytic heat exchanger may also be used as the support body.

The support body is then coated with as thin a layer as possible of permanently elastic organic polymer, the layer again being as much thinner as possible than the average particle size of the catalytically active material. Particularly thin layers of the organic polymer are obtained if the organic polymer is diluted in a suitable solvent and applied in this diluted form to the support body. In this case a certain waiting time is recommended before further use in order to dry or harden the polymer fully.

The catalytically active material is then applied to the thin layer of the organic polymer, for instance by allowing it to trickle through the support body or blowing it onto said body. After drying or hardening, the finished supported catalyst is ready for use.

The supported catalysts according to the invention are very easy to produce, effective at relatively low temperature, impact-stable, and may be used in place of non-catalytic heat exchangers as catalytic heat exchangers without requiring any additional space.

The invention will be explained in further detail by the following examples which are merely illustrative and are not intended to limit its scope.

EXAMPLE 1

Production of a Supported Catalyst Useful for Catalytically Oxidizing Carbon Monoxide 1.1. Production of the catalytically active material:

An aqueous solution containing 7 g/l gold and 38 g/l iron was produced by dissolving chloroauric acid and iron (III) nitrate in distilled water. 10 ml of an aqueous solution of ammonium carbonate, the concentration of ammonium carbonate of which was about 290 g/l were added to 14 ml of this aqueous solution while stirring. The solids which were precipitated were separated off by filtration, dried at about 25° C. for a period of 24 hours and then calcined for 5 hours at a temperature of about 400° C. The calcined solids were then crushed to a particle size of 0.09 mm in a mortar. The yield was approximately 750 mg.

1.2 Coating the support material with catalytic material:

A flexible aluminum sheet with the dimensions 60 mm × 40 mm × 0.08 mm was used as the metal foil. This aluminum sheet weighed 680 mg.

An acrylic ester adhesive (Henkel "Sichello" I6613 adhesive) was used as the adhesion-promoting organic polymer. The adhesive was dissolved in acetone, so that a solution was produced which contained 20% by weight of the adhesive. The aluminum sheet was immersed in this solution, removed from the solution, and dried for 30 minutes at about 80° C. Weighing of the sheet coated with the adhesion promoter showed that 285.2 mg of the adhesive had been applied to the sheet. The aluminum sheet, which was coated on both sides, was then powdered with the catalytically active material produced according to Example 1.1, which had a grain size of less than 0.09 mm. Weighing showed that 156.5 mg of the active material were adhered to the sheet. The sheet coated with the catalytically active material was then dried for a further two hours.

Then the material was coiled in a spiral. The distance of the coils from each other was about 8 mm.

1.3. Use of the supported catalyst of Example 1.2 to oxidize carbon monoxide:

A dry air stream was passed through the supported catalyst at a rate of 10 l per hour. This air stream contained carbon monoxide in a concentration of 115 ppm. The air leaving the supported catalyst had a carbon monoxide content of only about 101 ppm. The conversion was accordingly 12%.

EXAMPLE 2

2.1 Production of catalytically active material:

The catalytically active material was produced as described under 1.1However, the mixture was multiplied by four. The yield was 3 g.

2.2. Coating the support with catalytic material:

An aluminum sheet was again used as the metal foil. The dimensions of the aluminum sheet were 228 mm × 48 mm × 0.08 mm. The sheet weighed 3.1 g. The "Sichello" adhesive described above was again used, again in the form of a solution in acetone, containing 20% by wt. adhesive. The sheet was immersed in this solution and then removed. After a short drying time, the sheet was weighed, and it was found that 1.9 g of the adhesive had been applied to both sides of the sheet.

The sheet coated with the adhesive was powdered with the catalytically active material of Example 2.1., which had been ground to a particle size of less than 0.25 mm in a mortar. Weighing of the coated sheet showed that approximately 2.0 g of the catalytically active material were fixed on the sides of the sheet.

This coated sheet was rolled up in a spiral to a diameter of 2.5 cm.

2.3. Use of the supported catalyst of Example 2.2:

A dry air stream was passed through the supported catalyst, which was wound in a spiral, at a rate of 90 l per hour at a temperature of 25° C. The air stream contained about 100 ppm carbon monoxide before entering the catalyst. The air leaving the supported catalyst contained only 59 ppm carbon monoxide. The conversion therefore amounted to 41%.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A supported catalyst for catalytically treating gaseous media at temperatures below about 100Ⓡ C., comprising:
    a) a support body made of metal foil having a thickness of at most 0.5 mm, said support body being provided with at least two channels permeable to the gaseous medium to be treated, said channels having a height of less than about 10 mm,
    b) a catalytic material having a particle size between about 0.05 mm and 0.3 mm, said material being catalytically active at a temperature below about 100° C., and
    c) a permanently elastic organic adhesive on said metal foil, said coating adhering said catalytic material to said support body.

2. A supported catalyst according to claim 1, wherein said support body is a metal foil having a thickness of at most 0.5 mm which has been wound into a spiral support body having a distance of less than about 10 mm between adjacent spiral layers formed upon winding.

3. A supported catalyst according to claim 1, wherein said support body is formed of a plurality of metal foils having a thickness of at most 0.5 mm arranged in layers with the distance between adjacent layers being less than about 10 mm.

4. A supported catalyst according to claim 3, wherein said support body comprises at least 10 laminar metal foils arranged substantially parallel to each other in layers.

5. A supported catalyst according to claim 1, wherein said metal foil is coated on both sides with said catalytic material.

6. A supported catalyst according to claim 1, further comprising means for supplying heat to or removing heat from said catalyst.

7. A supported catalyst according to claim 6, wherein said heat supplying or removing means comprises at least one channel through which a fluid heat exchange medium flows.

8. A supported catalyst according to claim 1, for catalytic decomposition of ozone, wherein said catalytic material is a precious metal, a metal oxide, or a mixture thereof.

9. A supported catalyst according to claim 8, wherein said catalytic material comprises a precious metal selected from the group consisting of palladium and platinum.

10. A supported catalyst according to claim 1, for the catalytic oxidation of carbon monoxide, wherein said catalytic material comprises a mixture of gold and at least one metal oxide selected from the group consisting of iron (III) oxide, tricobalt tetroxide, and nickel oxide.

11. A supported catalyst according to claim 10, wherein said catalytic material comprises a mixture of gold and iron (III) oxide.

12. A supported catalyst according to claim 11, wherein said support body is a metal foil having a thickness of at most 0.5 mm which has been wound into a spiral support body having a distance of less than about 10 mm between adjacent spiral layers formed upon winding.

13. A supported catalyst according to claim 11, wherein said support body is formed of a plurality of metal foils having a thickness of at most 0.5 mm arranged in layers with the distance between adjacent layers being less than about 10 mm.

14. A supported catalyst according to claim 11, wherein said support body is formed by a plurality of laminar metal foils which are arranged in layers substantially parallel to each other, and wherein said support body is provided with at least one channel through which a fluid heat exchange medium flows.

* * * * *